Patented June 17, 1952

2,600,683

UNITED STATES PATENT OFFICE 2,600,683

TRIFLUOROCHLOROETHYLENE-VINYL ACETATE COPOLYMERS

Frank G. Pearson, Bryn Mawr, Pa., assignor to American Viscose Corporation, Wilmington, Del., a corporation of Delaware No Drawing. Application May 8, 1947, Serial No. 746,882

19 Claims. (Cl. 260—87.1)

This invention relates to copolymers of trifluorochloroethylene with vinyl acetate and the products obtained by partial or complete hydrolysis of the acetate groups thereof. This application is a continuation-in-part of my copending application Serial No. 509,761, filed November 10, 1943, now abandoned.

Linear polymers containing halogen substituents only are extremely hydrophobic, and filaments made from them are also of this character. Fabrics made therefrom have the serious disadvantage of not being capable of absorbing moisture from the body of the wearer, which gives rise to a feeling of discomfort to the wearer, especially in warm or hot weather. In addition, the failure to pick up or retain small but appreciable amounts of water greatly hampers the ability of the fabrics made therefrom to recover from any distortions produced during wear.

It is an object of this invention to produce novel copolymers of trifluorochloroethylene which have improved properties adapting them especially for the production of filaments and fabrics having improved characteristics, and particularly a controllable hydrophilic character, so that the above-mentioned disadvantages are substantially overcome or greatly reduced.

In accordance with this invention, it has been found that trifluorochloroethylene copolymerizes with vinyl acetate and the products have properties which are desirable particularly for the manufacture of filaments and fabrics therefrom intended for wearing apparel as well as industrial fabrics, felts, papers, and the like. By controlling the proportions of the monomers and the conditions of copolymerization, the proportion of hydrophilic ester groups in the product may be predetermined to impart the desired moisture retention property thereto.

In general, trifluorochloroethylene and vinyl acetate may be copolymerized at room or somewhat higher temperatures up to about 50° C. either in the presence of a cataylst or under the influence of ultraviolet light, or under the influence of both catalyst and ultraviolet light. The catalyst may be an organic or inorganic peroxygen compound, such as benzoyl peroxide. The monomers may be copolymerized in bulk or in solution in a suitable solvent, such as acetone. Copolymerization is quite rapid and may be completed in periods of from five to eight hours, though longer periods may be necessary in certain circumstances.

The following examples are illustrative of preferred procedures of making copolymers in accordance with this invention:

Example 1

A mixture of 30 parts by volume of trifluorochloroethylene, 3 parts by volume of vinyl acetate, and about 1.5% by weight of a mixture of equal amounts of lead tetraethyl and benzoyl peroxide was formed in a suitable vessel transparent to ultraviolet light, and in which the mixture was held under pressure to maintain the monomers in the liquid condition. The contents were subjected to ultraviolet light at room temperature and were suitably shaken until the complete disappearance of the liquid phase.

The product thus obtained was soluble in acetone, chloroform, butanone; was insoluble in alcohol and ether; and was swelled by dioxane. The product begins to soften about 120° C. and as the temperature is raised it becomes more plastic but never really melts. Up to 250° C. there are no signs of decomposition. The copolymer had a degree of polymerization of about 400 and the ratio of the vinyl acetate monomer to the trifluorochloroethylene monomer in the coploymer was 1:4.

Example 2

A mixture of 11.3 parts by volume of trifluorochloroethylene and 3.7 parts by volume of vinyl acetate and 40 parts by volume of an aqueous solution containing 3% by weight of Gardinol WA (sodium lauryl sulfate) and 0.01% by weight of uranyl acetate was sealed in a vessel transparent to ultraviolet light. The contents of the tube were continuously agitated and subjected to ultraviolet light at room temperature for 168 hours. A 67.5% yield was obtained of a product having a softening temperature of 80° C. and a melting temperature of 175° C. The product container 27 mol percent vinyl acetate and the remainder of trifluorochloroethylene.

Example 3

The procedure of Example 1 was followed with a mixture of 30 parts by volume of trifluorochloroethylene and 5 parts by volume of vinyl acetate using only 1% by weight of the catalyst mixture. The product which was soluble in chloroform, soluble to the extent of about 20% by weight in acetone, but insoluble in methanol and isopropanol, contained 33.1 mol percent of vinyl acetate and was found to string on a hot plate at a temperature of 115° C. It formed colorless extensible filaments which developed orientation along the fiber axis upon stretching.

Example 4

The procedure of Example 1 was followed with a mixture of 30 parts by volume of trifluorochloroethylene, 6 parts by volume of vinyl acetate, and 1% of the catalyst mixture, exposure to ultraviolet light being effected for a period of 84 hours. The product was a copolymer containing 36 mol percent of vinyl acetate which softens at 80° C. and strings at 125° C.

Example 5

A mixture of trifluorochloroethylene and vinyl acetate in 1:1 molar ratio was subjected to the procedure of Example 1 in the presence of 1% of the mixed catalyst. The product contained 56.5 mol percent of vinyl acetate and had a shrinkage temperature of 52° C., and a melting point of 102° C. It was soluble in acetone and chloroform, but insoluble in ethanol. Filaments were formed from the copolymer and were capable of being oriented by drawing in the cold or at temperatures up to about 40° C.

Example 6

A copolymer containing 10 mol percent of vinyl acetate and produced as described above in Example 1, except that only 1 part of vinyl acetate was used for 30 parts of trifluorochloroethylene, was extruded in fused condition at temperatures of 190° to 200° C. into filaments of small diameter. By subjecting the filaments to stretching during extrusion or by after-stretching the formed and set filaments for which purpose they were rendered soft either by heat or solvent-action, the filaments are improved in flexibility and tensile strength and exhibit molecular orientation. The filaments had a shrinkage temperature of about 110° C.

Example 7

A copolymer containing 5 mol percent of vinyl acetate and produced as in Example 1 except that only 1 part by volume of vinyl acetate was used for 60 parts by volume of trifluorochloroethylene was extruded in fused condition at temperatures of 200 to 220° C. into small diameter filaments After stretching as in Example 6, the filaments showed no shrinkage up to 110° C.

Example 8

A copolymer containing 12 mol percent of vinyl acetate and produced as in Example 1 except that only 1.2 parts by volume of vinyl acetate were used for 30 parts by volume of trifluorochloroethylene was extruded in fused condition at temperatures of 185 to 195° C. into filaments. After stretching as in Example 6, the filaments showed no shrinkage up to 105° C.

Example 9

Ten grams of copolymer of Example 3 containing 33.1 mol percent vinyl acetate were dissolved in 100 cc. chloroform. This solution was then allowed to run in a fine stream, with vigorous stirring, into 250 cc. of a saturated solution of hydrogen chloride in a mixture of 75% chloroform-25% methyl alcohol by volume.

The slightly turbid mixture was then refluxed for one hour and allowed to stand for sixteen hours at room temperature. The polymer was recovered by precipitation in 1.5 liters of isopropanol. It was removed by filtration and dried in vacuo.

Analysis shows that 25% of the available acetate groups were removed by this procedure. The product which had solubility characteristics similar to that of the parent copolymer, became tacky at 140° C., had a string-point of 200° C. and was free of any discoloration up to 300° C. The filaments formed by stringing showed no shrinkage during subjection to boiling water for two minutes.

Example 10

A copolymer containing 79.6 mol percent of vinyl acetate, and produced as in Example 5 except that the molar ratio of 3:1 existed between the vinyl acetate and trifluorochloroethylene in the starting mixture, was subjected to hydrolysis as in Example 9 until 50% of the available acetate groups were replaced by hydroxyl. The resulting product showed no evidence of any shrinkage, softening, or tackiness up to 160° C. A 10% (by weight) solution of the product in a mixture of 75% chloroform and 25% methyl alcohol by volume was spun into an aqueous isopropanol coagulating bath to form filaments.

By varying the proportions between the monomers in the initial reacting mixture, products can be obtained having any desired proportion of vinyl acetate therein, from less than 1% up to 99% or more. Preferably, for the production of filaments to be used generally for making textile fabrics, it is desirable that the shrinkage as well as the softening temperature of the filaments thereof be safely over 100° C., and also that the filaments have an appreciable moisture retention of at least 3½% by weight. For this purpose, copolymers of trifluorochloroethylene with at least 5 mol percent but not over 12 mol percent of the vinyl acetate component are generally satisfactory. However, for other specialized filaments, a higher proportion of vinyl acetate may be desired in the copolymers used. Thus, in making industrial fabrics, felts, and papers which are not subjected to temperatures above the softening or shrinkage temperature of the particular copolymer used, copolymers containing from 5 mol percent up to 57 mol percent of vinyl acetate are useful. These copolymers may be deformed but do not completely lose their filamentous shape or character when subjected to temperatures below 100° C. Filaments made of such thermoplastic fibers may be converted into yarns, fabrics, felts, and papers, with or without admixture of other fibers or filaments which are not rendered plastic at any temperature or at least at the low temperatures needed for the copolymer fibers of the present invention. After such conversion, the fibers can be bonded to reinforce the articles by heating them to the thermal tacking point of the thermoplastic copolymer fibers so that they adhere to each other by coalescence and to any other fibers present by deformation or adhesion.

Copolymers containing from 30 to 80 mol percent of vinyl acetate are advantageous in that by hydrolysis, either completely or partially, as in Example 9, materials are obtained which have shrinkage points and melting points well above 100° C. and moisture-retention characteristics which can be preselected by control of the extent of hydrolysis.

All of the copolymers of the present invention are remarkably resistant to decomposition by heat and light. The most heat-sensitive of them show no discoloration until a temperature of 250° C. is reached and some of them give no sign of decomposition even at temperatures of 300° to 320° C. This characteristic places the decomposition point far above the melting point of the copolymers so that molding can be readily performed even without incorporation of heat stabilizers. The copolymers in the range of 5 to 12 mol percent vinyl acetate have the best chemical resistance and are non-inflammable.

In general, the copolymers produced may be formed directly into filaments by melt-spinning through spinneret orifices. To facilitate such spinning, there may be added plasticizers, heat stabilizers, lubricants and the like.

Besides converting the copolymers of trifluorochloroethylene with vinyl acetate into filaments by melt-spinning, they may be dissolved in suitable solvents and either wet or dry spun into the form of filaments. In addition, films and molded articles of any desired shape may be produced from the copolymers by utilization of their thermoplasticity or by using a solution thereof in the solvents mentioned above. The filaments, films, or other structures may be formed with or without admixture of pigments, fillers, plasticizers and other resins.

It is to be understood that changes and variations may be made without departing from the spirit and scope of the invention as defined by the appended claims.

I claim:

1. A material comprising a copolymer whose monomeric constituents consist of trifluorochloroethylene and vinyl acetate, the copolymer containing from 5 to 80 mol percent of vinyl acetate.

2. The material of claim 1 in which the copolymer contains from 5 to 57 mol percent of vinyl acetate.

3. The material of claim 2 in the form of filaments.

4. The material of claim 1 in which the copolymer contains from 5 to 12 mol percent of vinyl acetate.

5. The material of claim 4 in the form of filaments showing orientation along the fiber axis.

6. The material of claim 1 in which the copolymer contains from 30 to 80 mol percent of vinyl acetate.

7. A material comprising a copolymer whose monomeric constituents consist of trifluorochloroethylene and vinyl acetate, the copolymer containing approximately 10 mol percent of vinyl acetate.

8. The material of claim 7 in the form of filaments.

9. A material comprising a copolymer whose monomeric constituents comprise trifluorochloroethylene and at least one compound selected from the group consisting of vinyl acetate and vinyl alcohol, the copolymer containing from 5 to 80 mol percent of vinyl acetate when no vinyl alcohol groups are present and, when vinyl alcohol groups are present, being derived by hydrolyzing from a copolymer containing from 5 to 80 mol percent of vinyl acetate and the remainder of trifluorochloroethylene.

10. A material in accordance with claim 9 comprising a hydrolyzed copolymer in which from 25 to 100 percent of the acetyl groups have been removed.

11. A material in accordance with claim 9 comprising a hydrolyzed copolymer in which from 25 to 50 percent of the acetyl groups have been removed.

12. The material of claim 11 in the form of filaments.

13. A process for the production of a polymeric material which comprises copolymerizing a mixture of polymerizable compounds consisting of trifluorochloroethylene and vinyl acetate in the presence of a peroxygen compound at temperatures from room temperatures up to 50° C.

14. The process of claim 13 in which the copolymerization is performed under the influence of ultra-violet light.

15. The process of claim 13 in which the copolymerization is effected under pressure sufficient to maintain the monomers in liquid condition.

16. A process in accordance with claim 13 in which the trifluorochloroethylene-vinyl acetate copolymer is at least partially hydrolyzed in the presence of hydrochloric acid.

17. The process of claim 16 in which the hydrolysis is effected by passing a solution of the copolymer into a saturated solution of hydrogen chloride in an organic solvent for the hydrolyzed copolymer, and the hydrolyzed copolymer being then precipitated by the introduction of the solution into a non-solvent therefor.

18. A solid polymer consisting of from about 33–72 mole percent vinyl acetate and from about 67–28 mole percent chlorotrifluoroethylene, copolymerized therein.

19. A solid polymer consisting of about 33 mole percent vinyl acetate and about 67 mole percent chlorotrifluoroethylene copolymerized therein.

FRANK G. PEARSON.

REFERENCES CITED

The following references are of record in the file of this patent:

UNITED STATES PATENTS

| Number | Name | Date |
|---|---|---|
| 1,935,577 | Reid | Nov. 14, 1933 |
| 2,386,347 | Roland, Jr. | Oct. 9, 1945 |

FOREIGN PATENTS

| Number | Country | Date |
|---|---|---|
| 796,026 | France | Mar. 27, 1936 |

OTHER REFERENCES

Douglas: "Vinyl Resins," Industrial and Engineering Chem., March 1940, vol. 32, No. 3, page 316.